United States Patent
Schleiermacher et al.

(10) Patent No.: US 9,718,936 B2
(45) Date of Patent: Aug. 1, 2017

(54) METHOD FOR PRODUCING A HARD POLYURETHANE-POLYISOCYANURATE FOAMED MATERIAL

(71) Applicant: Covestro Deutschland AG, Leverkusen (DE)

(72) Inventors: Stephan Schleiermacher, Pulheim (DE); Patrick Klasen, Vettweiss (DE); Reinhard Albers, Leverkusen (DE); Stephan Moers, Brüggen (DE); Dirk Steinmeister, Leverkusen (DE); Dieter Seidel, Köln (DE); Torsten Heinemann, Leichlingen (DE); Hans-Detlef Arntz, Lohmar (DE)

(73) Assignee: Covestro Deutschland AG, Leverkusen (DE)

(*) Notice: Subject to any disclaimer, the term of this patent is extended or adjusted under 35 U.S.C. 154(b) by 193 days.

(21) Appl. No.: 14/377,072

(22) PCT Filed: Feb. 5, 2013

(86) PCT No.: PCT/EP2013/052238
§ 371 (c)(1),
(2) Date: Aug. 6, 2014

(87) PCT Pub. No.: WO2013/117541
PCT Pub. Date: Aug. 15, 2013

(65) Prior Publication Data
US 2015/0051301 A1 Feb. 19, 2015

(30) Foreign Application Priority Data
Feb. 8, 2012 (EP) .................. 12154364

(51) Int. Cl.
| | | |
|---|---|---|
| C08J 9/00 | (2006.01) |
| C08G 18/48 | (2006.01) |
| C08G 18/76 | (2006.01) |
| C08G 18/79 | (2006.01) |
| C08G 18/30 | (2006.01) |
| C08G 18/09 | (2006.01) |
| C08G 18/10 | (2006.01) |
| C08G 18/22 | (2006.01) |
| C08G 18/42 | (2006.01) |
| C08G 18/32 | (2006.01) |
| C08G 18/73 | (2006.01) |

(Continued)

(52) U.S. Cl.
CPC .............. *C08J 9/00* (2013.01); *C08G 18/092* (2013.01); *C08G 18/10* (2013.01); *C08G 18/225* (2013.01); *C08G 18/3206* (2013.01); *C08G 18/4238* (2013.01); *C08G 18/4837* (2013.01); *C08G 18/73* (2013.01); *C08G 18/7664* (2013.01); *C08G 18/794* (2013.01); *C08J 9/365* (2013.01); *C08G 18/302* (2013.01); *C08G 2101/005* (2013.01); *C08G 2101/0025* (2013.01); *C08G 2101/0083* (2013.01); *C08J 2375/08* (2013.01)

(58) Field of Classification Search
CPC ..... C08G 18/10; C08G 18/092; C08G 18/302
See application file for complete search history.

(56) References Cited

U.S. PATENT DOCUMENTS

| | | |
|---|---|---|
| 4,299,924 A | 11/1981 | Nomura et al. |
| 5,534,299 A | 7/1996 | Eisen et al. |

(Continued)

FOREIGN PATENT DOCUMENTS

| | | |
|---|---|---|
| EP | 0293211 A2 | 11/1988 |
| EP | 0297687 A2 | 1/1989 |

(Continued)

OTHER PUBLICATIONS

International Search Resort for PCT/EP2013/052238 mailed Jul. 4, 2013.

Primary Examiner — Melissa Rioja
(74) Attorney, Agent, or Firm — K&L Gates LLP

(57) ABSTRACT

The present invention relates to a process for producing a rigid polyurethane-polyisocyanurate foam C, comprising the step of reacting (i) an isocyanate-terminated prepolymer B with (ii) an activator component A comprising at least one trimerization catalyst A1 and at least one blowing agent A3 in a reaction mixture to form a foam, characterized in that—there is used an isocyanate-terminated prepolymer B obtained from a reaction of an isocyanate B1 having a mean isocyanate functionality of from $\geq 2.3$ to $\leq 2.9$ with a polyol component B2, and—the activator component A comprises water as the blowing agent A3 in an amount of from $\geq 5$ wt. % to $\leq 50$ wt. %,—the isocyanate index in the reaction mixture is in a range of from $\geq 400$ to $\geq 500$, and—the isocyanate content of the prepolymer B is in a range of from $\geq 21$ wt. % to $\leq 30$ wt. %, based on the total mass of the prepolymer B, and—wherein in the reaction of the prepolymer B and the activator component A a conversion contribution to polyisocyanurate of $\leq 75\%$ is achieved. Rigid foams C so produced have good flame retarding properties while at the same time having good insulating properties and stability properties. The present invention relates further to a rigid polyisocyanurate foam C produced by the process according to the invention, to the use of such a rigid polyisocyanurate foam C in the production of heat-insulating structural components, and to a heat-insulating structural component comprising such a rigid polyurethane-polyisocyanurate foam.

13 Claims, No Drawings

(51) Int. Cl.
*C08J 9/36* (2006.01)
*C08G 101/00* (2006.01)

(56) References Cited

U.S. PATENT DOCUMENTS

2006/0047011 A1    3/2006  Kusan-Bindels et al.
2011/0201709 A1*   8/2011  Athey ................. C08G 18/022
                                                        521/128

FOREIGN PATENT DOCUMENTS

| EP | 0698422 A1 | 2/1996 |
| EP | 1632511 A1 | 3/2006 |
| EP | 1967535 A1 | 9/2008 |
| WO | WO-2004111101 A1 | 12/2004 |
| WO | WO-2007042407 A1 | 4/2007 |
| WO | WO-2007042411 A1 | 4/2007 |

* cited by examiner

METHOD FOR PRODUCING A HARD POLYURETHANE-POLYISOCYANURATE FOAMED MATERIAL

CROSS-REFERENCE TO RELATED APPLICATIONS

This application is a national stage application (under 35 U.S.C. §371) of PCT/EP2013/052238, filed Feb. 5, 2013, which claims benefit of European Application No. 12154364.9, filed Feb. 8, 2012, both of which are incorporated herein by reference in their entirety.

The present invention relates to a process for producing a rigid polyurethane-polyisocyanurate foam, in particular such a foam which is sprayable, by reacting a mixture comprising an isocyanate component and an activator component. The invention relates further to a rigid polyurethane-polyisocyanurate foam produced by the process according to the invention, and to the use of such a rigid foam in the production of heat-insulating structural components. The invention relates further to a heat-insulating structural component comprising a rigid polyurethane-polyisocyanurate foam according to the invention.

In the oil and gas industry, for example, sprayable polyurethane systems are used for insulating pipes. Rigid polyurethane-polyisocyanurate (PUR/PIR) foams used here must meet strict requirements as regards adhesion, compressive strength and emission while at the same time having excellent insulating and fire protection properties. The same is true for further structural components, such as, for example, structural components for buildings, which are to be used, for example, for heat insulation.

The spraying systems which can be used to produce corresponding rigid PUR/PIR foams should preferably have a short setting time in order to avoid excessive dripping or running. This is achieved in the prior art primarily by using correspondingly large amounts of catalysts and crosslinkers. However, the use of catalysts and crosslinkers in excessively large amounts is associated with the risk of embrittlement. Such foams would have a sandy surface, and composite materials would accordingly have very poor adhesive strengths to, for example, steel pipes. Moreover, such systems in most cases offer limited stability, in particular at high temperatures, and limited flame retarding properties.

GB 1,104,394 relates to isocyanurate foams and a process for producing isocyanurate foams. The process can be carried out as a one-stage process or by a route comprising a prepolymer, that is to say as a multi-stage process. Diphenylmethane diisocyanate, for example, can be used as the isocyanate, and suitable isocyanate-reactive components according to that publication are those which carry up to 8 hydroxyl groups, such as, for example, polyalkylene ether glycols, and have an OH number of from 30 to 600 mg KOH/g. The isocyanate can further be present in the reaction mixture in an excess of from 400 to 800 mol %. Beyond that, no specific details are given regarding the isocyanate functionality or the isocyanate content.

U.S. Pat. No. 4,299,924 describes polyisocyanurate resins which can be obtained by a reaction of a polyisocyanate with a polymeric polyol obtained from a high molecular weight polyol having a molar weight of at least 4500 g/mol, optionally in the presence of a crosslinker. In the case of a reaction without a crosslinker, an isocyanate index of from 1500 to 5000 is used, whereas the isocyanate index in the case of a process with a crosslinker is in a range of from 200 to 5000. No specific details are given regarding the isocyanate functionality.

EP 0 698 422 A1 describes a process for insulating pipes by the composite principle, wherein at least one layer of a polyisocyanurate plastic and then at least one layer of a rigid polyurethane foam are applied to a steel pipe, followed by a covering layer. The polyisocyanurate plastic can be produced by reacting an aromatic polyisocyanate or a prepolymer having terminal NCO groups and an isocyanate content of from 5 to 20 wt. % with a polyol component comprising a polyether, water, crosslinker and a trimerisation catalyst, the polyol component having an OH number in a range of from 300 to 600 mg KOH/g.

WO 2007/042407 A1, WO 2004 111101 A1 and WO 2007/042411 A1 relate to processes for producing a polyisocyanurate-polyurethane material. The starting materials used in such processes are a polyether polyol having a high oxyethylene content and a polyisocyanate having a high diphenylmethane diisocyanate content. In these processes, low NCO functionalities of <2.2 are used at high isocyanate indices. In addition, in these publications, rigid foams having a high hard segment content are produced (WO 2007/042407 A1), the operation is carried out with the exclusion of water (WO 2004 111101 A1) or isocyanate indices in a range of from 1600 to 100,000 are present (WO 2007/042411 A1).

EP 1 967 535 A1 discloses a compact polyisocyanate and a process for its production. However, processes for producing compact polymers are not transferrable to the production of foams.

It is clear from the above that there continues to be a need for improved sprayable rigid PUR/PIR foams. Accordingly, the present invention has set itself the object of providing in particular water-blown rigid PUR/PIR foams which have good heat insulating behaviour while at the same time having high stability and good flame resistance.

This object is achieved according to the invention by a process for producing a rigid polyurethane-polyisocyanurate foam C, comprising the step of reacting
(i) an isocyanate-terminated prepolymer B with
(ii) an activator component A comprising at least one trimerisation catalyst A1 and at least one blowing agent A3
in a reaction mixture to form a foam, wherein
there is used an isocyanate-terminated prepolymer B obtained from a reaction of an isocyanate B1 having a mean isocyanate functionality of from ≥2.3 to ≤2.9 with a polyol component B2,
the activator component A comprises water as the blowing agent A3 in an amount of from ≥5 wt. % to ≤50 wt. %,
the isocyanate index in the reaction mixture is in a range of from ≥400 to ≤1500,
the NCO content of the prepolymer B is in a range of from ≥21 wt. % to ≤30 wt. %, based on the total mass of the prepolymer B, and
wherein in the reaction of the prepolymer B and the activator component A, a conversion contribution to polyisocyanurate of ≤75% is achieved.

It has now been found, surprisingly, that it is possible by means of the corresponding combination of the above-mentioned components to produce rigid PUR/PIR foams which have excellent flame retarding properties and heat insulating properties and which further have excellent stability properties.

Contrary to the prevailing opinion that good flame retarding properties are attributable essentially to a high conversion of the polyisocyanate to polyisocyanurates, it is possible according to the invention to produce rigid PUR/PIR foams C having good flame retarding properties, good thermal conductivity and good stability with only a comparatively low conversion to polyisocyanurate.

A rigid polyurethane-polyisocyanurate foam, or a rigid PUR/PIR foam, is one which comprises substantially polyisocyanurate groups but in which polyurethane groups can also be present.

Within the context of the present invention, a rigid foam can be understood as being in particular a foam, that is to say according to DIN 7726 a two-phase system, in which gas is arranged, in particular dispersed, in a solid matrix, which, as a rigid foam, has a high compressive strength of ≥0.1 MPa.

Within the context of the present invention, an activator component A can be understood as being in particular a component which can activate polyisocyanurate formation.

Within the context of the present invention, an isocyanate index can be understood as being in particular the excess of isocyanate relative to a theoretically required amount for a 1:1 reaction of all the isocyanate groups with isocyanate-reactive compounds in the reaction mixture or in the isocyanurate formation.

Within the context of the present invention, a mean isocyanate functionality, or NCO functionality, can be understood as being in particular the mean number of isocyanate groups per molecule of the isocyanate B1 used.

Within the context of the present invention, an isocyanate content, or NCO content, can be understood as being in particular the amount by weight of NCO groups in the isocyanate-terminated prepolymer B.

Within the context of the present invention, the OH number, or hydroxy number, corresponds in particular to the amount of potassium hydroxide in milligrams which corresponds to the amount of acetic acid bonded in an acetylation of one gram of substance. All the OH numbers, or hydroxyl numbers, mentioned can be determined in accordance with DIN 53240.

Within the context of the present invention, the mean functionality of the polyol component B2 can denote in particular the mean number of hydroxy groups per molecule of the polyol component B2 used.

The prepolymer B that is used will first be discussed hereinbelow. The isocyanate-terminated prepolymer B is obtained from a reaction of an isocyanate B1 with a polyol component B2. Examples of suitable isocyanates B1 are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate (TDI), 1,5-naphthylene diisocyanate, 2,2'- and/or 2,4'- and/or 4,4'-diphenylmethane diisocyanate (MDI) and/or higher homologues (polymeric MDI), 1,3- and/or 1,4-bis-(2-isocyanatoprop-2-yl)-benzene (TMXDI), 1,3-bis-(isocyanatomethyl)benzene (XDI) and alkyl 2,6-diisocyanatohexanoates (lysine diisocyanates) having $C_1$- to $C_6$-alkyl groups, or mixtures comprising one or more of the above-mentioned components.

In addition to the isocyanates B1 mentioned above, the concomitant use of a proportion of modified diisocyanates with a uretdione, isocyanurate, urethane, carbodiimide, uretonimine, allophanate, biuret, amide, iminooxadiazinedione and/or oxadiazinetrione structure as well as unmodified polyisocyanate having more than 2 NCO groups per molecule, such as, for example, 4-isocyanatomethyl-1,8-octane diisocyanate (nonane triisocyanate) or triphenylmethane 4,4',4''-triisocyanate, is possible.

The mean isocyanate functionality of the isocyanate B1 is in a range of from ≥2.3 to ≤2.9.

Furthermore, the isocyanate content of the isocyanate prepolymer B is in a range of from ≥21 wt. % to ≤30 wt. %. The NCO content of the prepolymer B is particularly preferably in a range of from ≥22 wt. % to ≤29 wt. %. The isocyanate content can be determined in accordance with DIN 53185.

Moreover, the possibility that further isocyanate compounds may be present in the reaction mixture in addition to the prepolymer B is not excluded according to the invention. Such further isocyanate compounds can be, for example, those as have been described above for the preparation of the prepolymer B.

The isocyanates B1 can also include polynuclear (polymeric) isocyanates, such as, for example, polynuclear MDI.

The preparation of the isocyanate-reactive polyol component B2 used for the preparation of the prepolymers B will be discussed in greater detail in the following.

Examples for the polyol component B2 are aromatic polyester polyols, for example polycondensation products of di- as well as also tri- and tetra-ols and di- and also tri- and tetra-carboxylic acids or hydroxycarboxylic acids or lactones. Instead of the free polycarboxylic acids, the corresponding polycarboxylic anhydrides or corresponding polycarboxylic acid esters of lower alcohols can also be used for preparing the polyesters. Examples of suitable diols are ethylene glycol, butylene glycol, diethylene glycol, triethylene glycol, polyalkylene glycols such as polyethylene glycol, also 1,2-propanediol, 1,3-propanediol, (1,3)-butanediol, (1,4)-butanediol, (1,6)-hexanediol and isomers, neopentyl glycol or hydroxypivalic acid neopentyl glycol ester. In addition, polyols such as trimethylolpropane, glycerol, erythritol, pentaerythritol, trimethylolbenzene or trishydroxyethyl isocyanurate can also be used. Ethylene glycol and diethylene glycol are preferably used.

As polycarboxylic acids there can be used, for example, succinic acid, fumaric acid, maleic acid, maleic anhydride, glutaric acid, adipic acid, sebacic acid, 1,10-decanedicarboxylic acid, 1,12-dodecanedicarboxylic acid, phthalic acid, phthalic anhydride, isophthalic acid, terephthalic acid, pyromellitic acid or trimellitic acid. Adipic acid and phthalic anhydride are preferably used.

Provided that the mean functionality of the polyol to be esterified is ≥2, monocarboxylic acids such as benzoic acid and hexanecarboxylic acid can additionally also be used concomitantly.

There are preferably used for the polyol component B2 compounds which have a mean OH functionality of from ≥2 to ≤8, an OH number of from ≥28 mg KOH/g to ≤500 mg KOH/g (DIN 53240) and optionally primary OH groups.

The polyol component B2 can further comprise a polyether polyol.

There can be used as the polyether polyol at least one addition product of styrene oxide, ethylene oxide, propylene oxide, butylene oxide and/or epichlorohydrin on di- or poly-functional starter molecules.

Suitable starter molecules are, for example, water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and low molecular weight, hydroxyl-group-containing esters of such polyols with dicarboxylic acids.

As regards the prepolymers B, the polyol components B2 are preferably selected from aliphatic or aromatic polyether polyols having in each case from 2 to 8 hydroxy groups or aliphatic or aromatic polyester polyols having in each case a number-average molecular mass of from ≥200 g/mol to ≤12,500 g/mol.

Within the group of the polyol components B2, polyether polyols are particularly preferred. Their fire results are slightly better than those of polyester polyols having the same OH number.

The polyol component B2 can further comprise brominated and/or chlorinated polyols, such as, for example, Ixol M125, which are known to improve the flame resistance of rigid PUR/PIR foams.

An isocyanate index in a range of from ≥400 to ≤1500 can further be present in the reaction mixture comprising the prepolymer B and the activator component A.

The prepolymers B can be prepared in a one-stage process which is known per se to the person skilled in the art and is described in the literature.

The activator component A will be discussed in greater detail below.

Examples of the trimerisation catalyst A1 or polyisocyanurate catalyst that is present are in a further embodiment tin(II) acetate, tin(II) octoate, tin(II) ethylhexanoate, tin(II) laurate, dibutyltin diacetate, dibutyltin dilaurate, dibutyltin maleate and/or dioctyltin diacetate, also tris-(N,N-dimethylaminopropyl)-s-hexahydrotriazine, tetramethylammonium hydroxide and/or sodium hydroxide or sodium N-[(2-hydroxy-5-nonylphenyl)methyl]-N-methylaminoacetate, sodium acetate, sodium octoate, potassium acetate and/or potassium octoate or mixtures of the above-mentioned catalysts.

Potassium acetate has been found to be particularly preferred within the context of the present invention.

Examples of a further catalyst component A2, which is not absolutely necessary according to the invention but is not excluded either, are: amine catalysts, in particular selected from the group triethylenediamine, N,N-dimethylcyclohexylamine, dicyclohexylmethylamine, tetramethylenediamine, 1-methyl-4-dimethylaminoethylpiperazine, triethylamine, tributylamine, dimethylbenzylamine, N,N,N"-tris-(dimethylaminopropyl)hexahydrotriazine, tris-(dimethylaminopropyl)amine, tris(dimethylaminomethyl)phenol, dimethylaminopropylformamide, N,N,N',N' tetramethylethylenediamine, N,N,N',N'-etramethylbutanediamine, tetramethylhexanediamine, pentamethyldiethylenetriamine, pentamethyldipropylenetriamine, tetramethyldiaminoethyl ether, dimethylpiperazine, 1,2-dimethylimidazole, 1-azabicyclo [3.3.0]octane, bis-(2-dimethylaminoethyl), bis-(dimethylaminopropyl)-urea, N-methylmorpholine, N-ethylmorpholine, N-cyclohexylmorpholine, 2,3-dimethyl-3,4,5,6-tetrahydropyrimidine, triethanolamine, diethanolamine, triisopropanolamine, N-methyldiethanolamine, N-ethyldiethanolamine and/or dimethylethanolamine.

For example, the further catalyst component A2 can be a blowing catalyst. This can be present, for example, in an amount of from ≥1 wt. % to ≤14 wt. %. Particularly suitable blowing catalysts are widely known to the person skilled in the art and include, for example, amine catalysts.

The total catalyst component can be present, for example, in an amount of from ≥1 wt.≤80 wt. %, based on the total mass of the activator component A.

As solvent for the catalyst A1 and/or A2, the activator component A can comprise a short-chained diol having an OH number of ≥400, such as, for example, diethylene glycol.

The activator component A can further comprise a foam stabiliser A4, in particular in an amount of from ≥5 wt. % to ≤50 wt. %, based on the total amount of the activator component A. The foam stabiliser A4 can preferably be a polyether siloxane, which is generally composed as a copolymer of ethylene oxide and/or propylene oxide and is configured with a polydimethylsiloxane radical as composite material.

In a further embodiment there can further be added to a part by weight of the activator component A a flame retardant A5, for example a liquid flame retardant, in particular in a content of from ≥3 parts by weight to ≤30 parts by weight. The flame retardant can preferably comprise phosphorus compounds. Such flame retardants A5 are described, for example, in "Kunststoffhandbuch", Volume 7 "Polyurethane", Chapter 6.1; purely by way of example, mention may be made of the esters of orthophosphoric acid and metaphosphoric acid, which can likewise comprise halogens. By the addition of flame retardant A5, the flame retarding properties can be improved further and tailored to the desired field of application.

For example, the reaction mixture can be completely water-blown, that is to say can comprise only water as the blowing agent A3. Water can thereby be present in an amount of from ≥5 to ≤50 wt. %. In one embodiment, the blowing agent A3 can accordingly be free of hydrocarbon blowing agents, halogenated hydrocarbon blowing agents and haloalkane blowing agents. The expression "free of" includes technically unavoidable traces of the mentioned blowing agents. However, according to this embodiment, none of those blowing agents is added deliberately.

Alternatively, the activator component A can comprise a further blowing agent in addition to water. This can be selected in particular from formic acid, carbon dioxide, nitrogen, fluorinated hydrocarbons, linear hydrocarbons and cyclic hydrocarbons. The further blowing agents can be present, relative to the blowing agent A3, in an amount by weight of ≤95 wt. %, based on the total amount of the total blowing agent A3.

Further aspects and embodiments of the present invention will be described below. They can be combined as desired, provided the contrary is not clearly apparent from the context.

In one embodiment, the reaction mixture, in particular the activator component A, does not comprise any polyols having an OH number of <400 mg KOH/g. Consequently, a reaction of the isocyanate-terminated prepolymer with the activator component A comprising at least one trimerisation catalyst and at least one blowing agent takes place in the reaction solution. An in particular long-chained polyol compound having an OH number of <400 mg KOH/g is not present, however. Any in particular short-chained polyol compounds having an OH number of ≤400 mg KOH/g, such as, for example, solvents used for catalyst compounds, for example diethylene glycol, can, however, be present in the activator component A.

In a further embodiment, the reaction mixture, in particular the activator component A, does not comprise flame retardant A5. It has been found according to the invention that an above-described reaction using the described components can yield flame retardancy that is already very good. Accordingly, depending on the application, it is possible to dispense with the addition of a further flame retardant A5 to the reaction mixture or to the activator component A. For example, it is already possible in this embodiment to produce rigid PUR/PIR foams which can be classified in fire protection class B2, determinable in accordance with DIN 4102.

In a further embodiment, a conversion contribution to polyisocyanurate of ≤75% is achieved in the reaction of the prepolymer B and the activator component A. The conversion contributions can be determined by ATR-FTIR spectroscopy, for example. The total NCO conversion and the conversion contributions of the reactions to isocyanurate, carbodiimide and urethane or urea were calculated from the peak areas of the relevant bands (NCO at 2270 cm$^{-1}$, isocyanurate at 1410 cm$^{-1}$, carbodiimide at 2130 cm$^{-1}$ and NH stretching vibration for urethane and urea at 3400 cm$^{-1}$). It was found that, by means of the process according to the invention, very good flame retarding properties or fire protection properties could be achieved even with such low conversion contributions to isocyanurate groups. This finding is contrary to the widely held opinion that good fire protection or flame retardancy is only possible by means of a high number of isocyanurate groups or a high conversion contribution to isocyanurate groups. The conversion contribution to polyisocyanurate can mean in particular the contribution of the reaction that is taking place to isocyanurate groups.

In a further embodiment, the process comprises the further step of the spray application of the reaction mixture to a substrate. Consequently, in this embodiment, the activator component A and the prepolymer B can be sprayed onto a substrate. The temperature of the substrate surface can be, for example, in a range of from ≥20° C. to ≤70° C., preferably from ≥30° C. to ≤60° C. After the spray application and curing of the foam, further layers can be applied to the foam. For example, a polyolefin covering layer can be applied by extrusion to a substrate so treated. In this embodiment, heat insulation, for example, with good flame retarding properties can be produced by a particularly simple application process. There can be used as the substrate, for example, structural elements such as walls, ceilings and floors, for example in buildings, or pipes for transporting liquid or gaseous media.

In a further embodiment, the prepolymer B and the activator component A are introduced individually from the outside into a spray channel of a nozzle via inlets and are mixed in the spray channel, it being possible for the spray channel to comprise one or more mixing levels into which at least one mixed gas is introduced through at least one tangentially arranged gas channel.

In this embodiment it is possible to mix the prepolymer B and the activator component A with gas streams in a spray channel in one or more mixing levels.

By means of a tangential arrangement of the gas channel or channels, a radial flow component can accordingly be imparted to the axial flow. As a result of this radial flow component, the components, in this case the prepolymer B and the activator component A, are mixed intensively with one another.

According to the invention, the direction of flow of the gas stream as it enters the spray channel runs outside the centre of the spray channel.

Accordingly, in this embodiment, in particular a so-called LIA (liquid injection by airstream) process takes place.

The gas stream can be selected, for example, from the group comprising an air stream, nitrogen stream, noble gas stream, carbon dioxide stream and/or nitrogen dioxide stream. The gas stream can further comprise a liquid and/or a solid, and a mixed gas can thus form. The liquid and/or the solid can be formed, for example, by additives which are to be introduced into the reaction mixture, or into the activator component A.

The present invention further provides a rigid polyurethane-polyisocyanurate foam C obtainable by a process according to the invention. The rigid polyurethane-polyisocyanurate foam C preferably has flame retarding properties, insulating properties and stability properties. In particular, the rigid polyisocyanurate foam C can be distinguished by very low combustibility and high compressive strength with a low coefficient of thermal conductivity and high heat resistance.

For example, the rigid polyurethane-polyiscyanurate foam C can have a bulk density of ≤150 kg/m$^3$. In this density range, the foam has a particularly good ratio of enclosed gas volume to polyurethane-polyisocyanurate matrix, so that the thermal conductivity can be particularly low, which can result in particularly good heat insulation. The density can be calculated in a simplified process by determining the mass of a cube having an edge length of 10 cm.

In one embodiment, the rigid polyurethane-polyisocyanurate foam C has a flame height of ≤150 mm, determinable in accordance with DIN 4102-1, in a fire test/edge and/or the rigid polyurethane-polyisocyanurate foam C has a flame height of ≤150 mm, determinable in accordance with DIN 4102-1, in a fire test/surface. In this embodiment, a particularly advantageous fire protection behaviour is possible. The fire test/edge and fire test/surface comprise edge flaming and surface flaming, respectively, as is apparent from DIN 4102-1.

In a further embodiment, the rigid polyurethane-polyisocyanurate foam C has a coefficient of thermal conductivity of ≤32 mW/(m×K), determinable in accordance with DIN 52616. Particularly good heat insulating behaviour is thereby ensured.

In a further embodiment, the rigid polyurethane-polyisocyanurate foam C has a compressive strength of ≥0.20 MPa, determinable in accordance with DIN 826. Particularly preferably, the rigid polyurethane-polyisocyanurate foam C can have a compressive strength of ≥0.3 MPa. The rigid polyurethane-polyisocyanurate foam C thereby acquires particularly high dimensional stability.

Finally, the invention relates also to the use of a rigid polyurethane-polyisocyanurate foam C according to the invention in the production of heat-insulating structural components. Examples of heat-insulating structural components include, for example, insulating foams, building parts, pipes, block foams, panels or sandwich elements. A rigid polyurethane-polyisocyanurate foam C is further very suitable for insulating layers for walls, ceilings and floors in buildings or as a constituent of composite materials, such as, for example, heat-insulated pipes for transporting liquid or gaseous media. In the case of heat-insulating structural components in particular, it can be desirable for the rigid polyurethane-polyisocyanurate foam C to have a good coefficient of thermal conductivity while at the same time having good fire protection behaviour and good stability.

The invention relates further to a heat-insulating structural component comprising a rigid polyurethane-polyisocyanurate foam C according to the invention. Examples of such structural components include, without implying any limitation, insulating layers for wall, ceilings and floors in buildings or as a constituent of composite materials, such as, for example, heat-insulated pipes for transporting liquid or gaseous media.

The present invention will be explained in greater detail by means of the following examples, but without being limited thereto.

EXAMPLES

Glossary

Isocyanate blend 1: Mixture consisting of 2,2'-MDI (0.4 wt. %), 2,4'-MDI (55 wt. %), 4,4'-MDI (44.6 wt. %), mean functionality of 2.0.

Isocyanate blend 2: Mixture consisting of 2,2'-MDI (0.3 wt. %), 2,4'-MDI (4.2 wt. %), 4,4'-MDI (49.1 wt. %), 3-nuclear MDI (32.2 wt. %), 4-nuclear MDI (14.2 wt. %), mean functionality of 2.9.

Polyol 1: Polyether polyol having a hydroxyl number of 37 mg KOH/g (DIN 53240) and an average OH functionality of 3. Obtained from the reaction of glycerol as starter component with ethylene oxide and propylene oxide, the ratio of ethylene oxide units (EO) to propylene oxide units (PO) in the polyether polyol being 71 wt. %/29 wt. %.

Polyol 2: Polyether polyol having a hydroxyl number of 112 mg KOH/g (DIN 53240) and an average OH functionality of 2. Obtained from the reaction of propylene glycol as starter component with propylene oxide.

Polyol 3: Poly(diethylene glycol adipate), acid number 0.5, OH number 112 mg KOH/g, average OH functionality of 2.

Polyol 4: Polyether polyol having a hydroxyl number of 35 mg KOH/g (DIN 53240) and an average OH functionality of 3. Obtained from the reaction of glycerol as starter component with ethylene oxide and propylene oxide, the a ratio of ethylene oxide units (EO) to propylene oxide units (PO) in the polyether polyol being 13.5 wt. %/86.5 wt. %.

Polyol 5: Polyether polyol having a hydroxyl number of 56 mg KOH/g (DIN 53240) and an average OH functionality of 2. Obtained from the reaction of propylene glycol as starter component with propylene oxide.

PIR catalyst: Potassium acetate in diethylene glycol (1:3) (trimerisation catalyst)

Blowing catalyst: Niax® A1 70 wt. % bis-(2-dimethylaminoethyl) ether dissolved in 30 wt. % dipropylene glycol (Momentive)

Foam stabiliser: Tegostab® B 8645 (Evonik)

In the tables below, the compositions of the isocyanate-terminated prepolymers B consisting of an isocyanate mixture B1 and a polyol B2 are shown, Examples 1 to 11 (Tables 1 to 3) being examples according to the invention, while Comparison Examples 12 to 15 (Table 4) do not show compositions according to the invention.

TABLE 1

| Polyol | | | Example | | |
|---|---|---|---|---|---|
| | | | 1 | 2 | 3 |
| | OH number | | | | |
| Polyol 1 | | 37 | 27.46 | 9.11 | 27.72 |
| Isocyanate | NCO % | | | | |
| Isocyanate blend 1 | | 33.6 | 41.90 | 53.99 | |
| Isocyanate blend 2 | | 30.8 | 27.94 | 36.00 | 72.28 |
| Polyol OH number | | | 37 | 37 | 37 |
| Polyol functionality | | | 3 | 3 | 3 |
| Isocyanate NCO % desired | | | 22 | 29 | 22 |
| Isocyanate functionality | | | 2.3 | 2.3 | 2.9 |
| EO % in the prepolymer | | | 21 | 7 | 20 |
| EO % in the polyol | | | 71 | 71 | 71 |
| Hardness | | | o.k. | o.k. | o.k. |
| Bulk density free | | | 93.2 | 55.1 | 130.3 |
| Setting time | | | 60 | 31 | 44 |
| Bulk density test specimen | kg/m³ | | — | 64.3 | — |
| Coefficient of thermal conductivity | mW/(m × K) | | — | 24.9 | — |
| Fire test edge | mm | | — | 122 | — |
| Fire test surface | mm | | | 122 | |
| Torsion | ° C. | | — | >210 | — |
| Compressive strength in SR | MPa | | — | 0.39 | — |
| Compressive strength vertical 1 | MPa | | — | 0.38 | — |
| Panel no. 2 | kg/m³ | | | 72.1 | |
| Fire test edge | mm | | | 115 | |
| Fire test surface | mm | | | 122 | |

TABLE 2

| Polyol | | | Example | | | |
|---|---|---|---|---|---|---|
| | | | 4 | 5 | 6 | 7 |
| | OH number | | | | | |
| Polyol 4 | | 35 | 9.91 | 5.386 | | |
| Polyol 5 | | 56 | | | 9.49 | 5.14 |
| Isocyanate | NCO % | | | | | |
| Isocyanate blend 1 | | 33.6 | 54.04 | | 54.31 | |
| Isocyanate blend 2 | | 30.8 | 36.03 | 94.61 | 36.2 | 94.86 |
| Polyol OH number | | | 35 | 35 | 56 | 56 |
| Polyol functionality | | | 3 | 3 | 2 | 2 |
| Isocyanate NCO % desired | | | 29 | 29 | 29 | 29 |
| Isocyanate functionality | | | 2.3 | 2.9 | 2.3 | 2.9 |
| EO % in the prepolymer | | | 1 | 1 | 0.0 | 0.0 |
| EO % in the polyol | | | 13 | 13 | 0 | 0 |
| Hardness | | | o.k. | o.k. | o.k. | o.k. |
| Bulk density free | | | 65.30 | 72.00 | 57.70 | 70.20 |
| Setting time | | | 45.00 | 50.00 | 51.00 | 53.00 |
| Bulk density test specimen | kg/m³ | | 73.40 | 82.70 | 72.40 | 85.00 |
| Coefficient of thermal conductivity | mW/(m × K) | | 25.50 | 25.80 | 25.90 | 25.70 |

TABLE 2-continued

|  |  | Example | | | |
|---|---|---|---|---|---|
|  |  | 4 | 5 | 6 | 7 |
| Fire test edge | mm | 123.00 | 78.00 | 128.00 | 76.00 |
| Fire test surface | mm | 123.00 | 80.00 | 136.00 | 92.00 |
| Torsion | °C. | >210 | >210 | >210 | >210 |
| Compressive strength in SR | MPa | 0.47 | 0.62 | 0.41 | 0.52 |
| Compressive strength vert. 1 | MPa | 0.67 | 0.93 | 0.61 | 0.60 |
| Panel no. 2 | kg/m$^3$ | 84.9 | 82.2 |  |  |
| Fire test edge | mm | 112 | 68 |  |  |
| Fire test surface | mm | 118 | 80 |  |  |

TABLE 3

|  |  | Example | | | |
|---|---|---|---|---|---|
|  |  | 8 | 9 | 10 | 11 |
| Polyol | OH number |  |  |  |  |
| Polyol 2 | 112 |  |  | 8.52 | 4.59 |
| Polyol 3 | 112 | 8.52 | 4.59 |  |  |
| Isocyanate | NCO % |  |  |  |  |
| Isocyanate blend 1 | 33.6 | 54.89 |  | 54.89 |  |
| Isocyanate blend 2 | 30.8 | 36.59 | 95.41 | 36.59 | 95.41 |
| Polyol OH number |  | 112 | 112 | 112 | 112 |
| Polyol functionality |  | 2 | 2 | 2 | 2 |
| Isocyanate NCO % desired |  | 29 | 29 | 29 | 29 |
| Isocyanate functionality |  | 2.3 | 2.9 | 2.3 | 2.9 |
| EO % in the iso |  |  |  | 0 | 0 |
| EO % in the polyol |  |  |  | 0 | 0 |
| Hardness |  | o.k. | o.k. | o.k. | o.k. |
| Bulk density free |  | 51.00 | 75.20 | 50.70 | 68.00 |
| Setting time |  | 76.00 | 98.00 | 52.00 | 54.00 |
| Bulk density test specimen | kg/m$^3$ | 67.00 | 85.00 | 69.00 | 83.00 |
| Coefficient of thermal conductivity | mW/(m × K) | 26.30 | 24.70 | 25.50 | 25.90 |
| Fire test edge | mm | 134.00 | 84.00 | 122.0 | 74.00 |
| Fire test surface | mm | 140.00 | 100.0 | 140.0 | 86.00 |
| Torsion | °C. | >210 | >210 | >210 | >210 |
| Compressive strength in SR | MPa | 0.44 | 0.54 | 0.42 | 0.55 |
| Compressive strength vert. 1 | MPa | 0.56 | 0.64 | 0.47 | 0.69 |

TABLE 4

|  |  | Comparison Examples | | | |
|---|---|---|---|---|---|
|  |  | 12 | 13 | 14 | 15 |
| Polyol | OH number |  |  |  |  |
| Polyol 1 | 37 | 66.81 | 45.42 | 65.65 | 48.14 |
| Isocyanate | NCO % |  |  |  |  |
| Isocyanate blend 1 | 33.6 | 19.91 | 34.78 |  |  |
| Isocyanate blend 2 | 30.8 | 13.28 | 23.20 | 34.35 | 51.86 |
| Polyol OH number |  | 37 | 37 | 37 | 37 |
| Polyol functionality |  | 3 | 3 | 3 | 3 |
| Isocyanate NCO % desired |  | 9 | 15 | 9 | 15 |
| Isocyanate functionality |  | 2.3 | 2.3 | 2.9 | 2.9 |
| EO % in the iso |  | 47 | 35 | 47 | 34 |
| EO % in the polyol |  | 71 | 71 | 71 | 71 |
| Hardness |  | too soft | too soft | too soft | too soft |
| Setting time |  | — | 180 | 60 | 170 |

Test specimens were subsequently produced from the prepolymers B prepared according to the above-described tables using an activator component A.

The activator components A each comprised as additives a blowing catalyst A2 (Niax A1; 7 wt. %, based on the total amount of activator component A), a PIR catalyst A1 (potassium acetate in diethylene glycol, 1:3; 39 wt. %, based on the total amount of activator component A), a foam stabiliser A4 (Tegostab B8465; 29 wt. %, based on the total amount of activator component A) as well as water as blowing agent A3 in an amount of 25 wt. %, based on the total amount of activator component A.

Production of the Test Specimens:

Three different types of test specimen were produced for the tests:
1. foam samples from the free foam,
2. foam samples from the foaming of panels in a hinged-lid mould,
3. foam samples from the foaming of lightly compressed panels in a hinged-lid mould for clarification of the fire properties with the same core density.

The following reaction parameters apply generally for points 1. to 3.:

raw material temperature 23° C.
stirrer speed 2000 rpm (Pendraulik stirrer)
stirring time 6 to 8 seconds
activator component A was placed in the reaction vessel and the prepolymers B were added as the 2nd component,
mould temperature for points 2+3 was 45° C. in each case
all the foams were produced with an index of 800.

With regard to 1., the activator component A in the specified amount was introduced into a paper cup and adjusted to a temperature of 23° C. The prepolymer B, already preheated, is added in the calculated amount for index 800 to the activator component A and mixing is carried out for 6-8 seconds at 2000 rpm. The reaction mixture is then poured into a paper package and the following properties are determined:
reactivities (setting time)
core bulk density (bulk density from the middle of the foam in kg/m$^3$).

With regard to 2., in order to produce the panels, a hinged-lid mould (1100 mm*300 mm*50 mm) was heated to 45° C. and lined with paper. The activator component A and the prepolymer B were mixed together in a large paper cup to give a total amount (maintaining the index 800) of 1080 g. The reaction mixture was then poured directly into the open hinged-lid mould, and the mould was closed.

The following properties were determined from the resulting test specimens:

| | |
|---|---|
| core bulk density | (in accordance with DIN EN ISO 845) |
| compressive strengths | (DIN 826) |
| thermal conductivity | (DIN 52616) |
| fire behaviour | (DIN 4102-1). |

With regard to 3., the hinged-lid mould mentioned under point 2 was reduced to dimensions of 700 mm*300 mm*50 mm by means of an insert and was likewise adjusted to a temperature of 45° C. and lined with paper. For the prepolymers B of Example 2, a charging bulk density of 85 kg/m$^3$ was chosen.

In order to achieve a comparable core bulk density for Examples 4 and 5, a charging bulk density of 90 kg/m$^3$ was chosen for both. Foaming was carried out as under point 2. The following properties were determined from the resulting test specimens:

| | |
|---|---|
| core bulk density | (in accordance with DIN EN ISO 845) |
| fire behaviour | (DIN 4102-1) |
| PIR conversion by IR spectroscopy. | |

In the case of the test specimens produced according to the invention, the hardness was determined by an experienced engineer and classified as hard. The brittleness was likewise determined by an experienced engineer and classified as good. In the case of the hardness in particular, it was possible to show in the comparison examples that the hardness was not sufficient. Specifically, the comparison examples with low NCO percent exhibited a comparatively lower hardness.

Overall, it can be shown by examples that the establishment of the parameters according to the invention has an unexpected effect on the properties of the test specimens that are produced.

For example, it can be seen from the results in respect of the panels produced as described under 2. that the fire result can be improved by increasing the functionality of the isocyanate. In principle, all the examples according to the invention show good flame retarding properties or fire protection properties, determinable in accordance with DIN 4102-1.

By comparing Examples 4 with 6 and 5 with 7 it can further be shown that the compressive strength can be improved by increasing the polyol functionality.

A comparison of Examples 4 and 5, for example, shows that the good flame retarding properties are not directly dependent on the bulk density of the rigid foam C.

It could further be shown that the functionality of the isocyanate blends 1 and 2 has an immediate effect in the resulting foam density. In order to produce a foam having a particularly preferred density in a range of from 55 to 85 kg/m$^3$, an isocyanate functionality of from ≥2.3 to ≤2.9 is advantageous.

Moreover, it is apparent from the examples that such functionalities also make a positive contribution to the fire behaviour.

A polyether (polyols 1, 2, 4 and 5) shows further improved fire results while at the same time exhibiting similar bulk densities, coefficients of thermal conductivity and compressive strengths.

The above-mentioned examples were further tested for their total conversion or their specific conversion of the NCO groups to isocyanurate groups, urethane groups and urea groups as well as carbodiimide groups.

The tests were carried out by spectroscopy using ATR-FTIR spectroscopy (MIRacle ATR-FTIR attachment in a Bruker VERTEX 70 spectrometer) of produced test specimens in their foam core. To that end, a thin disk was prepared from each test specimen and ten spectra, each at a spacing of 2 em, were recorded thereon in order to evaluate the uniformity.

The result of the test is to be found in Table 5.

TABLE 5

| | | Examples | | |
|---|---|---|---|---|
| | | 2 | 4 | 5 |
| Isocyanate functionality | | 2.3 | 2.3 | 2.9 |
| EO in the polyol | % | 71 | 13 | 13 |
| Total NCO conversion | * | 87 | 82 | 70 |
| Conversion contribution of the reaction to | | | | |
| Isocyanurate | % | 63 | 62 | 53 |
| Urethane/urea | % | 9.8 | 8.5 | 6.9 |
| Carbodiimide | % | 14.9 | 11.1 | 11.1 |
| Flame height - edge | mm | 115 | 112 | 68 |
| flame height - surface | mm | 122 | 118 | 80 |

In the following, differences within the examples according to the invention are discussed, all of which already exhibit good fire protection behaviour.

It is clear that Example 5 with a comparatively higher NCO functionality of 2.9 has a lower conversion contribution of 53% to polyisocyanurate or to isocyanurate groups compared with Examples 2 and 4 (63% and 62%, respectively), which have a comparatively lower NCO functionality (2.3). Nevertheless, Example 5 exhibits an improved fire protection behaviour or flame retarding behaviour compared with Examples 2 and 4.

Consequently, the prepolymer composition can affect the reaction as follows: The total NCO conversion and the conversion to isocyanurate is lower in the cases with higher NCO functionality than in cases of low functionality. The stronger crosslinking already applied in the starting materials can accordingly hinder the reaction in particular in the end phase. The total conversion tends to be higher in the two systems with the EO-rich prepolymer than in the systems with the PO-rich prepolymer.

The invention claimed is:

1. A process for producing a rigid polyurethane-polyisocyanurate foam C, comprising the step of reacting
   (i) an isocyanate-terminated prepolymer B with
   (ii) an activator component A comprising at least one trimerisation catalyst A1 and at least one blowing agent A3
   in a reaction mixture to form a foam, wherein
      the isocyanate-terminated prepolymer B is obtained from a reaction of at least one isocyanate B1 having a mean isocyanate functionality of from $\geq 2.3$ to $\leq 2.9$ with a polyol component B2, and
      the activator component A comprises water as the blowing agent A3 in an amount of from $\geq 5$ wt. % to $\leq 50$ wt. %,
      the isocyanate index in the reaction mixture is in a range of from $\geq 400$ to $\leq 1500$,
      the isocyanate content of the prepolymer B is in a range of from $\geq 21$ wt. % to $\leq 30$ wt. %, based on the total mass of the prepolymer B, and
      wherein in the reaction of the prepolymer B and the activator component A, less than or equal to 75% of the isocyanate groups of the isocyanate-terminated prepolymer B are converted to polyisocynanurate groups and
      wherein the prepolymer B and the activator component A are introduced individually from the outside of the device into a spray channel of a nozzle via inlets and are mixed in the spray channel, the spray channel having at least one mixing level into which at least one mixed gas is introduced through at least one tangentially arranged gas channel.

2. The process according to claim 1, wherein the reaction mixture does not contain any polyols having an OH number of <400 mg KOH/g.

3. The process according to claim 1, wherein the reaction mixture does not contain a flame retardant.

4. The process according to claim 1, wherein the process comprises the further step of spray applying the reaction mixture to a substrate.

5. The process according to claim 1, wherein the isocyanate-terminated prepolymer B is obtained from at least one isocyanate B1 selected from the group consisting of toluene diisocyanate, diphenylmethane diisocyanate, hexamethylene diisocyanate, diisocyanato-dicyclohexylmethane and isophorone diisocyanate, and the polyol component B2 comprising at least one polyester polyol or polyether polyol.

6. The process according to claim 5, wherein the polyol component B2 comprising at least one polyether polyol that is the addition product of styrene oxide, ethylene oxide, propylene oxide, butylene oxide and/or epichlorohydrin on di- or poly-functional starter molecules.

7. The process according to claim 1, wherein at least one trimerisation catalyst A1 is selected from the group consisting of tin(II) acetate, tin(II) octoate, tin(II) ethylhexoate, tin(II) laurate, dibutyltin diacetate, dibutyltin dilaurate, dibutyltin maleate, dioctyltin diacetate, tris-(N,N-dimethylaminopropyl)-s-hexahydrotriazine, tetramethylammonium hydroxide, sodium hydroxide, sodium N-[(2-hydroxy-5-nonylphenyl)methyl]-N-methylaminoacetate, sodium acetate, sodium octoate, potassium acetate, potassium octoate, and mixtures thereof.

8. A rigid polyurethane-polyisocyanurate foam C obtained by the process according to claim 1.

9. The rigid polyurethane-polyisocyanurate foam C according to claim 8, wherein the rigid polyurethane-polyisocyanurate foam C has a flame height of $\leq 150$ mm, determinable in accordance with DIN 4102-1, using an edge flaming test and/or wherein the rigid polyurethane-polyisocyanurate foam C has a flame height of $\leq 150$ mm, determinable in accordance with DIN 4102-1, using a surface flaming test.

10. The rigid polyurethane-polyisocyanurate foam C according claim 8, wherein the rigid polyurethane-polyisocyanurate foam C has a coefficient of thermal conductivity of $\leq 32$ mW/(m×K), determinable in accordance with DIN 52616.

11. The rigid polyurethane-polyisocyanurate foam C according to claim 8, wherein the rigid polyurethane-polyisocyanurate foam C has a compressive strength of $\geq 0.20$ MPa, determinable in accordance with DIN 826.

12. A method comprising utilising the rigid polyurethane-polyisocyanurate foam C according to claim 8 in the production of heat-insulating structural components.

13. A heat-insulating structural component comprising a rigid polyurethane-polyisocyanurate foam C according to claim 8.

* * * * *